United States Patent
Xiao et al.

(10) Patent No.: US 8,892,155 B2
(45) Date of Patent: Nov. 18, 2014

(54) CELL SELECTION FOR MIMO TRANSMISSION

(75) Inventors: Hui Xiao, West Drayton (GB); Luciano Pietro Giacomo Sarperi, Bern (CH)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 13/415,417

(22) Filed: Mar. 8, 2012

(65) Prior Publication Data
US 2012/0165066 A1    Jun. 28, 2012

Related U.S. Application Data

(63) Continuation of application No. PCT/EP2009/006572, filed on Sep. 10, 2009.

(51) Int. Cl.
*H04W 72/06*    (2009.01)
*H04L 5/00*    (2006.01)
*H04L 25/03*    (2006.01)

(52) U.S. Cl.
CPC .............. *H04L 5/0037* (2013.01); *H04L 5/006* (2013.01); *H04L 5/0023* (2013.01); *H04L 5/0091* (2013.01); *H04L 25/03343* (2013.01); *H04L 2025/03426* (2013.01)
USPC ........... 455/525; 455/429; 455/446; 455/288; 455/422.1; 455/67.11

(58) Field of Classification Search
CPC .............. H04L 2025/03426; H04L 25/03343; H04L 5/0023; H04L 5/0037; H04L 5/006; H04L 5/0091
See application file for complete search history.

(56) References Cited

U.S. PATENT DOCUMENTS 8,385,833 B2 *    2/2013    Lindoff ................. 455/67.11
2008/0108363 A1 *    5/2008    Yu et al. ............... 455/450

(Continued)

FOREIGN PATENT DOCUMENTS

WO    2009/061660    5/2009

OTHER PUBLICATIONS

3GPP TR 36.814; V0.4.1; Further Advancements for E-UTRA; "Physical Layer Aspects"; (Release 9); Feb. 2009.

(Continued)

*Primary Examiner* — Yuwen Pan
*Assistant Examiner* — Fanghwa Wang
(74) *Attorney, Agent, or Firm* — Myers Wolin, LLC

(57) ABSTRACT

A method of selecting a cell or cells for use in multiple-input/multiple-output (MIMO) transmission to user equipment or a relay station in a serving cell of a cellular wireless network, there being a set of N cells of the cellular network from which a selection of cells is to be made, N being an integral number greater than one and the set including the serving cell, the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

28 Claims, 4 Drawing Sheets

(56) References Cited

U.S. PATENT DOCUMENTS

2008/0247478 A1 10/2008 Lee et al.
2011/0003598 A1* 1/2011 Ma et al. .................... 455/452.1
2012/0021738 A1* 1/2012 Koo et al. ................... 455/422.1

OTHER PUBLICATIONS

Fujitsu; 3GPP TSG RAN2 Meeting #66bis; R2-093959; "Discussion on Some Aspects for Signalling for CoMP Operation"; Agenda Item 7.5; Los Angeles, USA; Jun. 29-Jul. 3, 2009.
NEC Group; 3GPP TSG RAN WG1 Meeting #57; R1-091688; "Potential gain of DL CoMP with joint transmission"; Agenda Item 15.2; San Francisco, USA; May 4-8, 2009; [Ref.: ISR dated Jul. 6, 2010].
CHTTL; 3GPP TSG-RAN WG1 #57bis; R1-092833; "Discussions on CoMP Cooperating Set"; Agenda Item 15.2; Los Angeles, USA; Jun. 29-Jul. 3, 2009.
NTT DOCOMO; 3GPP TSG RAN WG1 Meeting #58; R1-093504; "Investigation on Advanced CoMP Scheme with MU-MIMO Techniques for LTE-Advanced Downlink"; Agenda Item 15.2; Shenzhen, China; Aug. 24-28, 2009; [Ref.: ISR dated Jul. 6, 2010].
Hitachi Ltd.; 3GPP TSG-RAN WG1 meeting #58; R1-093586; "Adaptive Cell Clustering for CoMP and implementary discussion"; Agenda Item 15.2; Shenzhen, China; Aug. 24-28, 2009; [Ref.: ISR dated Jul. 6, 2010].
Tokyo Institute of Technology, KDDI; 3GPP TSG RAN WG1 Meeting #58; R1-093608; "Distributed Dynamic CoMP for LTE-Advanced"; Agenda Item 15.2 (Study Item on LTE-Advanced CoMP); Shenzen, China; Aug. 24-28, 2009; [Ref.: ISR dated Jul. 6, 2010].
Tokyo Institute of Technology, KDDI; 3GPP TSG RAN WG1 Meeting #58B; R1-094285; "Distributed Dynamic CoMP for LTE-Advanced (Revision from R1-093608)"; Agenda Item 7.5 (CoMP); Miyazaki, Japan; Oct. 12-16, 2009; [Ref.: ISR dated Jul. 6, 2010].
Fujitsu; 3GPP TSG-RAN WG2 Meeting #66; R2-093075; "CoMP Cell Set Configuration"; Agenda Item 7; San Francisco, USA; May 4-8, 2009.
ETSI TS 136 214; V8.6.0; LTE; Evolved Universal Terrestrial Radio Access (E-UTRA); "Physical layer—Measurements" (3GPP TS 36.214 version 8.6.0 Release 8); Apr. 2009.
Ibrahim et al.; "Cooperative Communications with Partial Channel State Information: When to Cooperate?"; Nov. 28, 2005; [Ref.: ISR dated Jul. 6, 2010].
International search report issued for corresponding International Patent Application No. PCT/EP2009/006572, dated Jul. 6, 2010.
International preliminary report on patentability with written opinion issued for corresponding International Patent Application No. PCT/EP2009/006572 mailed Mar. 22, 2012.

* cited by examiner

CELL SELECTION FOR MIMO TRANSMISSION

This is a continuation of Application PCT/EP2009/006572, filed Sep. 10, 2009, now pending, the contents of which are herein wholly incorporated by reference.

The present invention relates to cell selection for MIMO (multiple-input/multiple-output) transmission in a cellular wireless network, in particular, but not exclusively, a 3GPP LTE-A network.

Wireless communication systems are widely known in which a base station communicates with multiple subscriber stations or users within range of the base station. The area covered by one base station is called a cell and typically, many base stations are provided in appropriate locations so as to cover a wide geographical area more or less seamlessly with adjacent cells. In conventional such cellular wireless networks the equipment of each user ("user equipment" or "UE") is only served by one base station at a time. However, this can result in low cell-edge data rates and coverage owing to high inter-cell interference at the cell-edge. To reduce the cell-edge interference it is beneficial to serve a cell UE by multiple base stations; this is termed "multi-cell multiple-input/multiple-output" or "multi-cell MIMO". By using multi-cell MIMO the harmful interference from neighbouring cells can be turned into useful signals, thereby improving cell-edge throughput and coverage.

While performing multi-cell MIMO transmission, additional data exchange on the backbone connection between base stations is required. Furthermore, it is necessary for the UE to feed back measurements to the serving base station about the multiple cells transmitting to that UE. Therefore, the determination of the set of cells which transmit to a UE, termed cell selection, has to be performed carefully in order to balance the performance gain versus the increased data exchange on the backbone connection and the signalling overhead on the air interface.

In the 3GPP LTE-A communication scheme multi-cell MIMO transmission is termed "coordinated multi-point transmission" or CoMP. The document 3GPP TR 36.814 "Further Advancements for E-UTRA Physical Layer Aspects (Release 9)", V1.0.0, 2009-02-26, discusses the fundamental principles of the 3GPP CoMP schemes, termed "Coordinated scheduling and/or beamforming" and "Joint Processing Transmission". In the former case, only one cell is used to transmit or receive data to or from a particular UE, while in the latter case multiple cells are used to transmit or receive data to or from a particular UE.

FIG. 1 illustrates an example of cell selection where cells A, B and C actively transmit to a UE (termed "CoMP Transmission Points"), while cell D is not transmitting during the transmission interval used by cells A, B and C. The set of cells A, B, C and D is termed a "CoMP Cooperating Set". In order to perform link adaptation and scheduling at the base stations while multi-cell MIMO transmission is active, the UE must report detailed channel measurements such as channel state information or narrow band Signal to Interference plus Noise Ratio (SINR) for the cells A, B and C. However, in order to save uplink feedback resources, it would be beneficial to select, prior to starting multi-cell MIMO transmission, cells which will directly or indirectly participate in the transmission to one or multiple UEs and hence for which detailed measurements are required during multi-cell MIMO operation. Such selection may be made using simple mid- to long-term measurements for the cells in the CoMP measurement set.

The 3GPP standards contributions R2-093959 "Discussion on Some Aspects of Signalling for CoMP Operation", Fujitsu, 3GPP TSG-RAN WG2 #66bis, Jun. 29-Jul. 3, 2009, Los Angeles, USA and R2-093075 "CoMP Cell Set Configuration", Fujitsu 3GPP TSG-RAN WG2 #66, May 4-8, 2009, San Francisco, USA on CoMP discuss that mid- to long-term Layer 2 or Layer 3 measurements such as Reference Signal Received Power (RSRP) may be used in order to determine the cells for which detailed channel measurements are required. Furthermore, R2-093075 "CoMP Cell Set Configuration", Fujitsu 3GPP TSG-RAN WG2 #66, May 4-8, 2009, San Francisco, USA proposes that the cell selection can be based on the dropping of some weak links to particular cells. In R2-093075 "CoMP Cell Set Configuration", Fujitsu 3GPP TSG-RAN WG2 #66, May 4-8, 2009, San Francisco, USA it is also discussed that mid- to long-term measurements are more appropriate, since frequent cell selection would result in increased signalling overhead between the serving base station (known as "evolved Node-B" or "eNB") and the UE, because the Layer 1 feedback required during multi-cell MIMO operation would have to be re-configured. In addition, frequent cell selection would also increase signalling on the X2 interface required for inter-eNB coordination.

The problem of cell selection has also been addressed in R1-092833 "Discussions on CoMP Cooperating Set", CHTTL, 3GPP TSG-RAN WG1 #57bis, Jun. 29-3, 2009, Los Angeles, USA, where the proposed solution is based on the following steps:

1. Rank the RSRP measurements $RSRP_0 \geq RSRP_1 \geq RSRP_2 \geq \ldots \geq RSRP_n$, where n is the number of cells of the candidate set of cells. The serving cell has the largest value.
2. The cell i is added to the UE's CoMP cooperating set if $$RSRP_0 - RSRP_1 \leq \gamma \qquad (1)$$

where $\gamma$ is a pre-defined threshold.

WO2009061660 discusses a method for selecting relay stations to perform either cooperative or non-cooperative communication with a UE. The selection of relay stations is based on threshold values using outage or throughput constraints, applied to both the base station to relay station and the relay station to UE links.

Furthermore, US2008247478 discloses a method for selecting a reference relay station and a cooperative relay station among a plurality of relay stations. The selection of the relay stations is based on location information of the UE and average CQI information. The information is sent from the relay stations to the base stations using a search request message.

It is desirable to provide an improved method of cell selection based on mid- to long-term measurements.

According to an embodiment of a first aspect of the present invention there is provided a method of selecting a cell or cells for use in multiple-input/multiple-output (MIMO) transmission to user equipment or a relay station in a serving cell of a cellular wireless network, there being a set of N cells of the cellular network from which a selection of cells is to be made, N being an integral number greater than one and the set including the serving cell, wherein the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a decision threshold parameter.

According to an embodiment of a second aspect of the present invention there is provided a method of selecting a cell or cells for use in multiple-input/multiple-output (MIMO) transmission to user equipment or a relay station in a serving cell of a cellular wireless network, wherein a decision is taken as to whether or not to use for transmission only the serving cell or multiple cells from a set of N cells of the cellular network, N being an integral number greater than one and the set including the serving cell, whereupon, if the decision is to use multiple cells, the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

In a method embodying the second aspect of the present invention, the decision as to whether or not to use only the serving cell or multiple cells for transmission may be made by comparing the ratio R of the received signal power from the serving cell to the sum of the received interference powers of all of the other cells in the said set of N cells with a second decision threshold parameter $\alpha$, and deciding to use only the serving cell for transmission if $R > \alpha$ and multiple cells for transmission if $R \leq \alpha$. The value of the second decision threshold parameter $\alpha$ may be such that the signal-to-interference ratio (SIR) for a receiver in the serving cell is equal to or above a desired target value.

A method embodying the first or second aspect of the present invention may be carried out, at least in part, at user equipment located in the serving cell. In this case, the user equipment may carry out selection of the group of M cells and inform the serving base station of the cells selected in descending order of received power. The serving base station may employ only a sub-set of the group of M cells for the transmission.

Alternatively a method embodying the first or second aspect of the present invention may be carried out, at least in part, at a base station of the serving cell. In this case, user equipment in the serving cell may feed back to the base station received power measurements for N cells, where N is less than or equal to the number of cells of the network for which the user equipment has such measurements, and the base station may carry out selection of the group of M cells using the fed back received power measurements for the N cells.

According to an embodiment of a third aspect of the present invention there is provided a communication system for a cellular wireless network, the system being operable to select a cell or cells for use in multiple-input/multiple-output (MIMO) transmission to user equipment or a relay station in a serving cell of the cellular wireless network, there being a set of N cells of the cellular network from which a selection of cells is to be made, N being an integral number greater than one and the set including the serving cell, wherein the system comprises: sorting means configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a decision threshold parameter.

According to an embodiment of a fourth aspect of the present invention there is provided a communication system for a cellular wireless network, the system being operable to select a cell or cells for use in multiple-input/multiple-output (MIMO) transmission to user equipment or a relay station in a serving cell of the cellular wireless network, wherein the system comprises: deciding means configured to decide whether or not to use for transmission only the serving cell or multiple cells from a set of N cells of the cellular network, N being an integral number greater than one and the set including the serving cell; sorting means operable, if the decision is to use multiple cells, and configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

In a system embodying the fourth aspect of the present invention, the deciding means may be operable to compare the ratio R of the received signal power from the serving cell to the sum of the received interference powers of all of the other cells in the said set of N cells with a second decision threshold parameter $\alpha$, and decide to use only the serving cell for transmission if $R > \alpha$ and multiple cells for transmission if $R \leq \alpha$. The value of the second decision threshold parameter $\alpha$ may be such that the signal-to-interference ratio (SIR) for a receiver in the serving cell is equal to or above a desired target value.

According to an embodiment of a fifth aspect of the present invention there is provided apparatus for use in a communication system for a cellular wireless network, the apparatus being operable to select a cell or cells for use in multiple-input/multiple-output (MIMO) transmission to user equipment or a relay station in a serving cell of the cellular wireless network, there being a set of N cells of the cellular network from which a selection of cells is to be made, N being an integral number greater than one and the set including the serving cell, wherein the apparatus comprises: sorting means configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a decision threshold parameter.

According to an embodiment of a sixth aspect of the present invention there is provided apparatus for use in a communication system for a cellular wireless network, the apparatus being operable to select a cell or cells for use in multiple-input/multiple-output (MIMO) transmission to user equipment or a relay station in a serving cell of the cellular wireless network, wherein the apparatus comprises: deciding means configured to decide whether or not to use for transmission only the serving cell or multiple cells from a set of N cells of the cellular network, N being an integral number greater than one and the set including the serving cell; sorting means operable, if the decision is to use multiple cells, and configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

In apparatus embodying the sixth aspect of the present invention, the deciding means may be operable to compare the ratio R of the received signal power from the serving cell to the sum of the received interference powers of all of the other cells in the said set of N cells with a second decision threshold parameter $\alpha$, and decide to use only the serving cell for transmission if $R > \alpha$ and multiple cells for transmission if $R \leq \alpha$. The value of the second decision threshold parameter $\alpha$ may be such that the signal-to-interference ratio (SIR) for a receiver in the serving cell is equal to or above a desired target value.

In a system embodying the third or fourth aspect of the present invention, or in apparatus embodying the fifth or sixth aspect of the present invention, at least one of the sorting means and the selection means may be located in user equipment located in the said serving cell. When the selection means are located in the user equipment, the user equipment may be configured to inform a base station of the serving cell of the cells selected in descending order of received power. The base station may employ only a sub-set of the group of M cells for the transmission.

Alternatively, in a system embodying the third or fourth aspect of the present invention, or in apparatus embodying the fifth or sixth aspect of the present invention, at least one of the sorting means and the selection means are located in the base station of the serving cell. When the selection means are located in the base station, user equipment in the serving cell is operable to feed back to the base station received power measurements for N cells, where N is less than or equal to the number of cells for which the user equipment has such measurements, the selection means being operable to carry out selection of the group of M cells using the fed back received power measurements for the N cells.

In a system embodying the fourth aspect of the present invention, or in apparatus embodying the sixth aspect of the present invention, the said deciding means may be located in user equipment located in the said serving cell or in the base station of the serving cell.

According to an embodiment of a seventh aspect of the present invention, there is provided a computer program which, when executed on a communication system of a cellular wireless network, is operable to carry out a method of selecting a cell or cells for use in multiple-input/multiple-output (MIMO) transmission to user equipment or a relay station in a serving cell of the cellular wireless network, there being a set of N cells of the cellular network from which a selection of cells is to be made, N being an integral number greater than one and the set including the serving cell, wherein the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a decision threshold parameter.

According to an embodiment of an eighth aspect of the present invention, there is provided a computer program which, when executed on a communication system of a cellular wireless network, is operable to carry out a method of selecting a cell or cells for use in multiple-input/multiple-output (MIMO) transmission to user equipment or a relay station in a serving cell of the cellular wireless network, wherein a decision is taken as to whether or not to use for transmission only the serving cell or multiple cells from a set of N cells of the cellular network, N being an integral number greater than one and the set including the serving cell, whereupon, if the decision is to use multiple cells, the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

According to an embodiment of a ninth aspect of the present invention, there is provided software which, when executed by a processor of apparatus in a communication system for a cellular wireless network, causes the apparatus to carry out a method according to the aforementioned first or second aspects of the present invention.

According to an embodiment of a tenth aspect of the present invention, there is provided software which, when executed by a processor of apparatus in a communication system for a cellular wireless network, causes the apparatus to become apparatus according to the aforementioned fifth or sixth aspects of the present invention.

In an embodiment of the present invention the decision threshold parameter β may have a value allowing multi-cell MIMO transmission using the selected M cells to achieve a desired signal-to-interference ratio (SIR). The decision threshold parameter β may be determined locally at the serving cell, or centrally by a central network element, or by negotiation amongst the base stations of multiple cells.

In an embodiment of the present invention the received powers may be Reference Signal Received Powers (RSRPs).

In an embodiment of the present invention the cellular wireless network may be a 3GPP network, in which case the set of N cells may be the Coordinated Multi-Point Transmission (CoMP) measurement set for the serving cell.

Embodiments of the present invention can therefore provide an improved method of cell selection and communication system and apparatus using such a method.

Reference will now be made, by way of example to the following drawings, in which.

A method embodying the present invention can be applied to several different cellular wireless networks, not only 3GPP LTE-A networks. A method embodying the present invention selects the cell or cells which are to directly or indirectly participate in the transmission to a particular UE and for which therefore detailed channel measurements are required during transmission. After these cells are selected, the UE has to feedback detailed channel measurements such as channel state information or narrow band Signal to Interference plus Noise (SINR) for the selected cells while transmission is active. In an optional preliminary step, in one embodiment of the present invention a selection is made as to whether the transmission mode should be multi-cell MIMO or single-cell transmission. The cell selection can be performed at the user equipment (UE), in which case the UE informs the serving base station of its selected cells. Alternatively, the cell selection can be performed at the base station of the serving cell based on measurement feedback from the UE.

Figure 2:
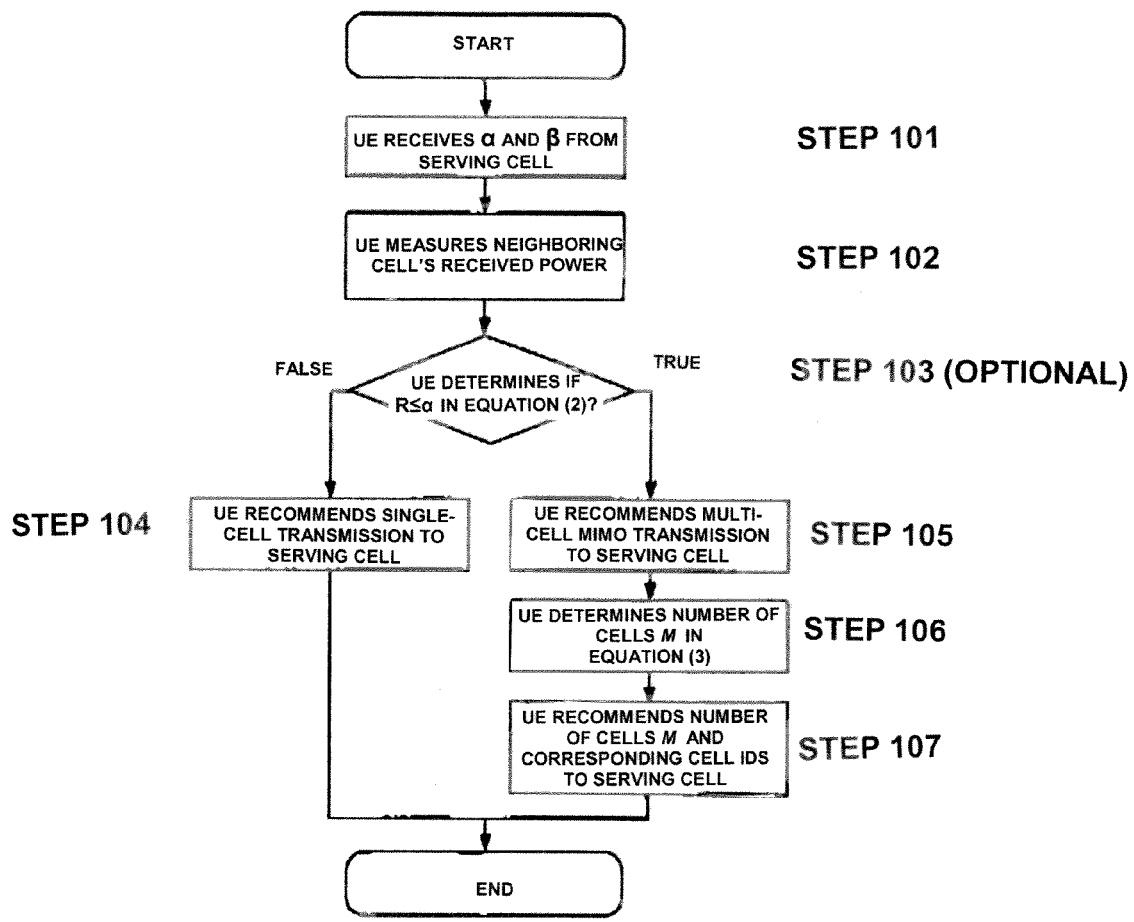
FIG. 2 is a flowchart illustrating the steps of a method embodying the present invention.
Figure 3:
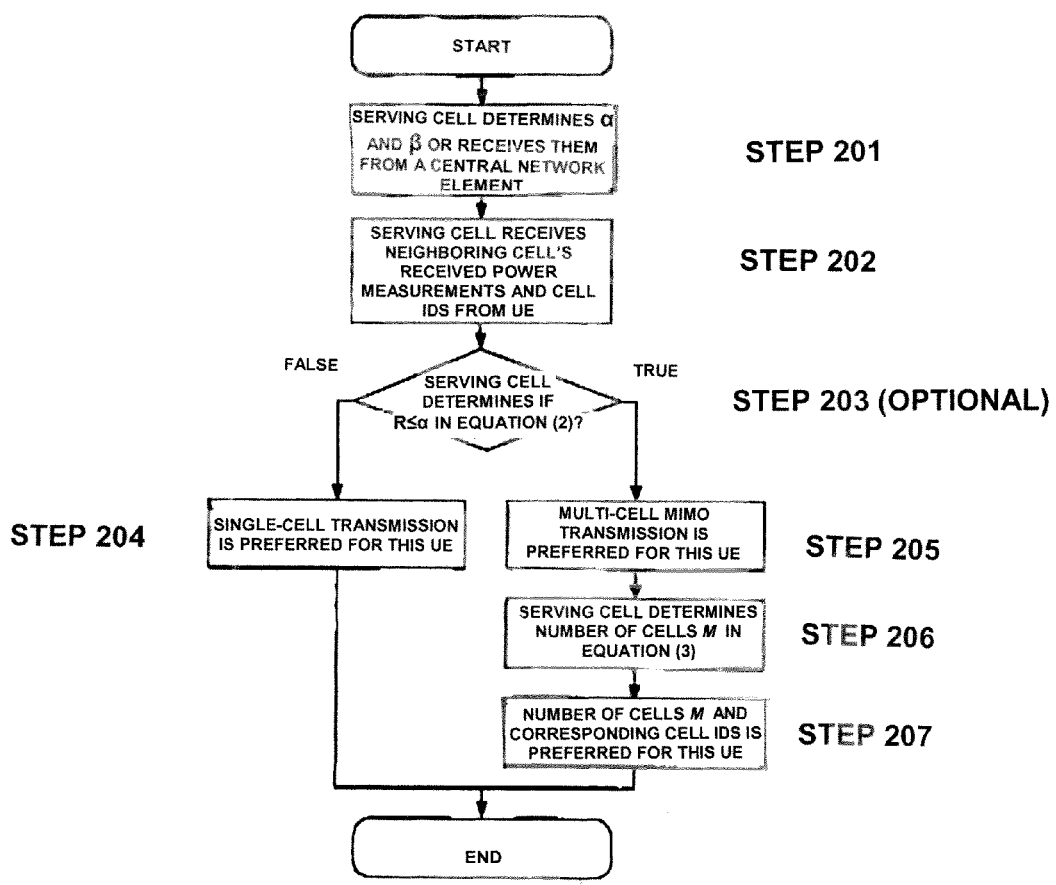
FIG. 3 is a flowchart illustrating the steps of another method embodying the present invention.

FIG. 2 shows the steps of a method embodying the present invention when carried out by user equipment (UE), whereas FIG. 3 shows the steps of a method embodying the present invention when carried out by the base station in the serving cell.

In STEP 101 of the method of FIG. 2, values for certain decision threshold parameters α and β are received by the UE from the base station of the serving cell. In STEP 201 of the method of FIG. 3, values for those decision threshold parameters α and β are either determined by the serving base station or received from a central network element. In STEP 102 of the method of FIG. 2 the UE measures the received interference powers of (N−1) cells neighboring the serving cell. In STEP 202 of the method of FIG. 3 the serving base station receives from the UE measurements of the received powers of N cells (the serving cell and (N−1) cells neighboring the serving cell) and their cell IDs.

In an optional preliminary step, STEP 103 of FIG. 2 and STEP 203 of FIG. 3, the method assesses which of the multi-cell MIMO transmission mode and the single-cell transmission mode is the more beneficial. This is done by comparing the ratio R of the received signal power from the serving cell to received interference power from neighbouring cells with a decision threshold parameter α, where R is given by $$R = \frac{P_0}{\sum_{i=1}^{N-1} P_i} \quad (2)$$

and $P_0$ is the received power from the serving cell in the single-cell transmission mode, $P_i$ is the received power from the neighbouring cell i, N is the total number of cells considered for potential multi-cell MIMO transmission and a is the decision threshold parameter received/determined in STEP 101/201. The ratio R is related to the potential SIR (signal-to-interference) gain which can be obtained by using the multi-cell MIMO transmission mode instead of single-cell transmission mode. A low value of R indicates that multi-cell MIMO transmission will significantly improve the SIR, since part of the large interference power would become useful signal power. Accordingly, if R≤α multi-cell MIMO transmission is used. Conversely, a high value of R indicates that multi-cell MIMO transmission will not be beneficial, since transforming part of the small interference power to useful signal power would only result in a small improvement of SIR. Accordingly, if R>α, single-cell transmission is used. This optional preliminary step is useful if a tight control on the usage of multi-cell MIMO is desired. For example, the usage of multi-cell MIMO could be limited to low SINR users by choosing a small value for α.

If in STEP 103/203 R>α, single-cell transmission is selected in STEP 104/204 for transmission to the UE. However, if R≤α, multi-cell MIMO transmission mode is selected in STEP 105/205. Then, in STEP 106/206, the number of cells which are to participate directly or indirectly in the multi-cell MIMO transmission are determined. It should be noted that, if the optional preliminary STEP 103/203 is not employed, the number of cells selected in the STEP 106/206 will implicitly contain the single-cell vs multi-cell MIMO transmission mode decision, by selecting either one or multiple cells.

In STEP 106/206, the number of cells is selected based on a sum power constraint. More precisely, it is selected such that a certain ratio of the total received power from all potential multi-cell MIMO transmission cells is captured by the UE when the selected cells participate in multi-cell MIMO transmission. First, the received powers from all of the N cells considered for potential multi-cell MIMO transmission are sorted in descending order, such that: $P_0 \geq P_1 \geq \ldots \geq P_{N-1}$. Then the number of selected cells M=∈{1, 2, ..., N} is found as the smallest value of M for which the following inequality:

$$\sum_{k=0}^{M-1} P_k \geq \beta \sum_{i=0}^{N-1} P_i \quad (3)$$

holds true.

In this embodiment, the value of the decision threshold parameter β is chosen so as to ensure that a predefined target SIR for multi-cell MIMO operation is obtained. However, the decision threshold parameter β may be chosen so as to indirectly fulfil some other criterion which is related to a target SIR, such as throughput, latency or jitter.

Finally, in STEP 107/207 the user equipment notifies the serving base station, or the serving base station notes, the recommended number and identity of the M cells to be used for transmission to the UE.

According to the method described with reference to FIG. 2, the cell selection is performed at the UE. In this case the serving cell sends the UE beforehand the two parameters α and β which are used in expressions (2) and (3) respectively to carry out the cell selection. Subsequently, the UE informs the serving cell about its cell selection decision, which includes the cell IDs of the selected cells in the descending order of the received power. Alternatively, according to the method described with reference to FIG. 3, the cell selection is performed at the serving cell's base station using the received power $P_i$ and cell ID feedback from the UE for the N cells considered for potential multi-cell MIMO transmission.

Furthermore, hybrid versions of the two cell selection approaches are also possible. A possible modification of the method of FIG. 2 is that the base station can further down-select the cells selected by the UE. A possible modification of the method of FIG. 3 is that the UE reports to the base station received power measurements and cell IDs for N cells, where N is less than or equal to the number of cells of the network for which the UE has such measurements, and the base station carries out selection of the group of M cells using the fed back received power measurements and cell IDs for the N cells. For example, the UE may discard some cells in the measurement set (the set of cells for which the UE has measurements) that have weak received powers compared with a threshold, the UE transmitting to the base station measurements and cell IDs for only those N cells for which the received powers are strong compared with that threshold.

The decision threshold parameters α and β may be determined in one of several different ways, for example either locally at the serving cell or in a centralized way by a central network element. Another possibility is that these parameters are determined by negotiation among multiple serving cells.

Figure 1:
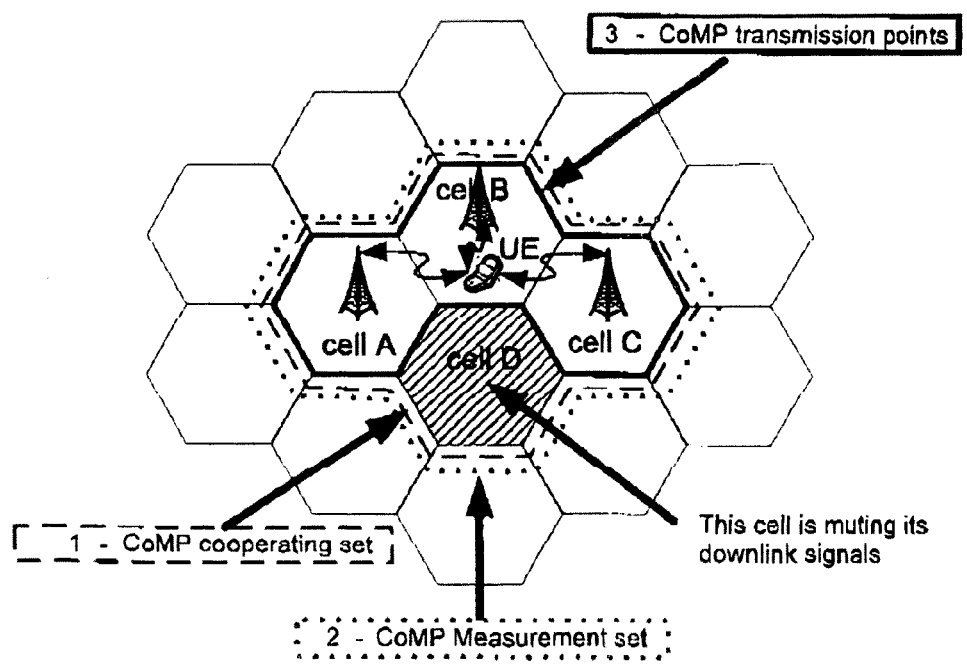
FIG. 1 (described above) illustrates multi-cell MIMO cell sets in 3GPP LTE-A.

In LTE-A the RSRP measurements (see, for example, "3GPP TS 36.214: Evolved Universal Terrestrial Radio Access (E-UTRA); Physical layer-measurements") could be used as the received powers $P_i$. The RSRP is a long-term wideband received signal power measurement derived from the reference signals. The number of cells N considered for potential multi-cell MIMO transmission could correspond to the CoMP measurement set shown in FIG. 1.

More generally (not necessarily in LTE-A), alternative received power measurements could be, for example, pilot measurements, preamble measurements or midamble measurements.

In summary, therefore, in one method embodying the present invention, the cell selection criterion is directly linked to a target SIR for multi-cell MIMO operation, which is not the case in the prior art. In particular, in an optional preliminary step, the SIR of the single-cell case is assessed, where the SIR is obtained by considering all candidate multi-cell MIMO cells, whereafter, if this SIR is below a threshold, the cell selection is performed based on a sum power constraint.

The proposed cell selection method has been evaluated by using Monte-Carlo simulations. Specifically, the performance of the proposed method in the resulted SIR and the number of selected cells was compared with that of the existing method disclosed in R1-092833 "Discussions on CoMP Cooperating Set", CHTTL, 3GPP TSG-RAN WG1 #57bis, Jun. 29-3, 2009, Los Angeles, USA. To simulate the received power values of each UE of the cells in the measurement set (see FIG. 1) a measurement set consisting of 19 cells with 3 sectors per cell was considered, which corresponded to 57 sectors in total. Each cell was hexagonal with a radius of 288 m, the distance between the centres of two neighbouring cells was 500 m, and the deployment of cells was in a wrap-around pattern. The received power from each sector was generated by considering the large-scale path-loss, shadowing, transmitter antenna gain and penetration loss; thus it can represent the long-term time averaged received power from each sector rather than the instantaneous received power with small-scale fading. The path-loss model adopted was $L_{i,k}$=128.1+37.6 $\log_{10}(d_{i,k})$, where $d_{i,k}$ was the distance from the ith UE to the transmitter in the kth sector, in units of km. The shadowing had a log-normal distribution with a standard deviation of 8 dB. The penetration loss was set as 20 dB. The transmitter antenna gain was 14 dBi, and $N_R=N_T=1$, where $N_R$ and $N_T$ denote the number of antennas at the UE and at the transmitter of each sector respectively. Thus for the ith UE, the received power from the kth sector was generated as follows:

$$P_{i,k}^{(Rx)} = 10^{\frac{P_{i,k}^{(Tx)}+G_{Tx}(\theta)-L_{i,k}-s_{i,k}-\varepsilon_{penetration}}{10}} \quad (4)$$

where $P_{i,k}^{Tx}$ represents the transmitted power from the kth sector to the ith UE, which was set as 46 dBm (39.8 W) in the simulations, $G_{Tx}(\theta)$ denotes the transmitter antenna gain in dB, $s_{i,k}$ is the shadowing factor for the ith UE with respect to the kth sector, and $\varepsilon_{penetration}$ denotes the penetration loss in dB. After calculation using equation (4), the received power $P_{i,k}^{(Rx)}$ of the ith UE from the kth sector in units of watt was obtained.

The UEs were uniformly distributed in the whole measurement set area with each sector having 120 UEs, and only the received power values of the UEs that were located in the three sectors of the centre cell were collected and used to evaluate the proposed method. Although there were 57 sectors in the entire measurement set, for each UE, only the power values from the 21 dominant interfering sectors were collected. Using the row vector $D_i$ (1×21 vector) to store the received power values from 21 different sectors for the ith UE, the proposed cell selection method embodying the present invention and the method known from R1-092833 "Discussions on CoMP Cooperating Set", CHTTL, 3GPP TSG-RAN WG1 #57bis, Jun. 29-3, 2009, Los Angeles, USA, were applied to the data $D_i$ of each UE separately to carry out the cell selection process. Note that subsequently the term "cell" is used to describe individual sectors.

In a method embodying the present invention, it is optional for each UE to use equation (2) to judge whether or not it is worth employing multi-cell MIMO transmission mode. If the optional preliminary step given by equation (2) is omitted, calculations based on the inequality (3) can be used directly to carry out the cell selection process, by which the transmission mode can be determined implicitly. To select cells according to inequality (3), the power values collected in D, were ranked in descending order and subsequently the cells that were to take part directly or indirectly in the multi-cell MIMO transmission were determined. In the simulations, the value of α in (2) was set to 4, and the value of β in (3) was set to 80%, which meant that the target potential linear SIR by using multi-cell MIMO transmission was 4 (6 dB); in this case the simulation results by using the optional preliminary step were the same as those without using it. Therefore, in the following, we only show the simulation results when the optional preliminary step was not employed.

Using the previously-proposed method of R1-092833 "Discussions on CoMP Cooperating Set", CHTTL, 3GPP TSG-RAN WG1 #57bis, Jun. 29-3, 2009, Los Angeles, USA, for each UE, the process performed to $D_i$ is as described in Section 2 of that document to select the cells which have relatively strong transmission power. In the simulations, the value of the pre-defined threshold $\gamma$ in expression (1) was set as 9 dB. Although generally speaking $\gamma$ can be predefined as any value, here 9 dB is used to obtain with the existing method a similar average number of selected cells to the method embodying the present invention in order to have a fair performance comparison with respect to the resulted SIR.

Figure 4:
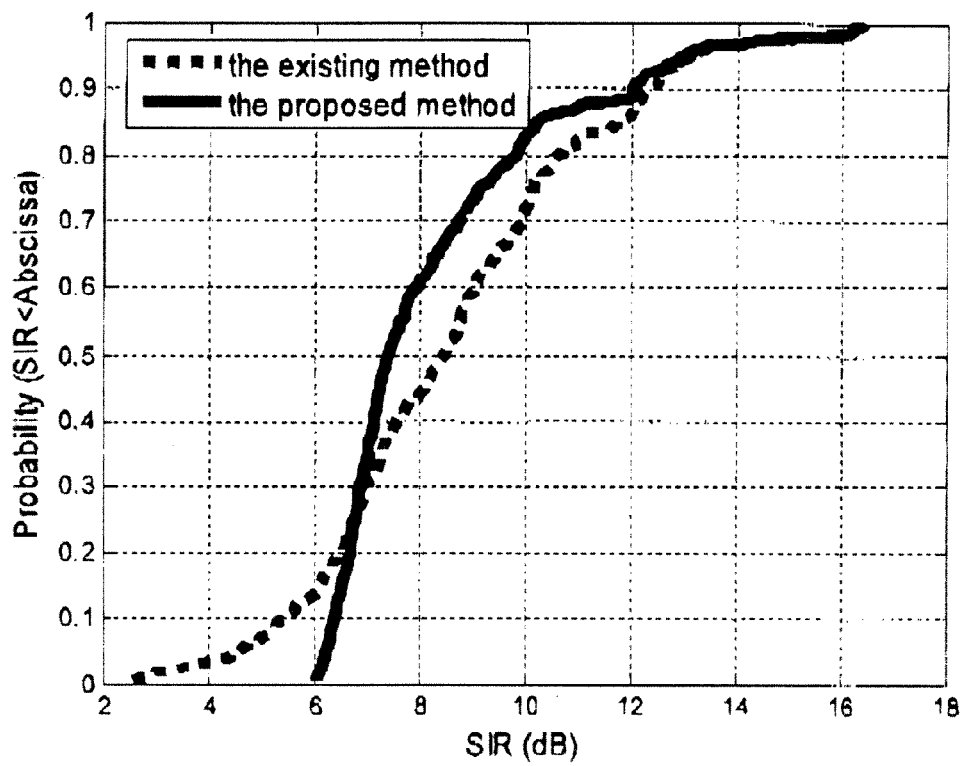
FIGS. 4 and 5 are graphs for use in comparing results of a method embodying the present invention with a previously-proposed method.

FIG. 4 shows the performance comparison with respect to the resulted potential SIR by using the two different cell selection methods. The two methods were applied respectively to the data of each of the considered UEs to select the cells that could fulfil their respective cell selection requirements, and then for both of the methods the resulted potential SIR was calculated as the ratio between the total power of the already selected cells and that of the unselected cells. In FIG. 4, the cumulative distribution functions (CDFs) of the resulted SIR are plotted. The dashed line represents the CDF when using the previously-proposed method and the solid line shows the CDF by using the method embodying the present invention.

For each method, the average number of selected cells was recorded, where the average was taken over the ensemble of all the considered UEs, and the values of the average number of selected cells are shown in Table 1.

TABLE 1

Comparison of the Number of Selected Cells

|  | Method embodying the Present Invention | Previously-Proposed Method |
|---|---|---|
| Average Number of Selected Cells | 2.62 | 2.64 |
| Variance of the Number of Selected Cells | 2.34 | 3.15 |

Figure 5:
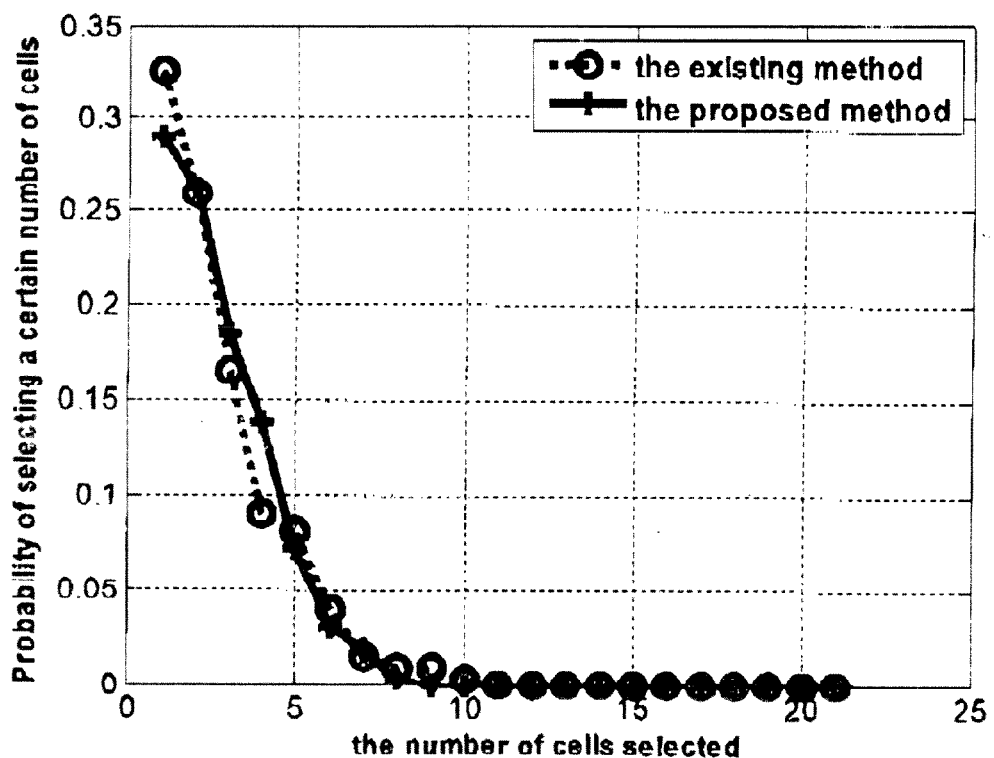

From Table 1, it can be seen that the two methods select a similar number of cells on average, which can provide a relatively fair platform for the performance comparison in terms of the resulted potential SIR. Additionally, the comparison with respect to the probability of a certain number of cells being selected is shown in FIG. 5, which shows that the existing method has a higher probability of selecting just a single cell since it does not use the target potential SIR as the cell selection principle.

The CDFs in FIG. 4 show that a method embodying the present invention outperforms the other method in the low SIR region, which is the region where UEs suffer from high interference and potentially need multi-cell transmission to reduce the interference level, which is also why multi-cell transmission mode was initially considered. Since a method embodying the present invention aims at a target potential SIR, it has more control over the resulted potential SIR, thus this low SIR region can be avoided by using a method embodying the present invention. Although the previously-proposed method has better performance in the middle SIR region, from the variance of the number of selected cells given in Table 1 for the two methods, it can be seen that the method embodying the present invention has a smaller variance in the number of selected cells, which may potentially help reduce base station scheduling complexity.

In practical implementations the maximum number of cells selected are likely to be constrained to a few, for example less than 6, however, the above performance gain is unlikely to be degraded significantly by such a restriction.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A method of selecting a cell or cells for use in multiple-input/multiple-output (MIMO) transmission to user equipment or a relay station in a serving cell of a cellular wireless network, there being a set of N cells of the cellular network from which a selection of cells is to be made, N being an integral number greater than one and the set including the serving cell, wherein the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a decision threshold parameter.

2. A method of selecting a cell or cells for use in multiple-input/multiple-output (MIMO) transmission to user equipment or a relay station in a serving cell of a cellular wireless network, wherein a decision is taken as to whether or not to use for transmission only the serving cell or multiple cells from a set of N cells of the cellular network, N being an integral number greater than one and the set including the serving cell, whereupon, if the decision is to use multiple cells, the received signal power of the serving cell and the received interference power of the other cells in the set relative to the serving cell are sorted in descending order of power P, such that $P_0 \geq P_1 \geq \ldots \geq P_{N-1}$, and a group of M cells are selected from the said set of N cells, where the cells selected are those giving the smallest value of M for which the inequality $$\sum_{k=0}^{M-1} P_k \geq \beta \sum_{i=0}^{N-1} P_i$$

is satisfied, $\beta$ being a first decision threshold parameter.

3. A method as claimed in claim 2, wherein the decision as to whether or not to use only the serving cell or multiple cells for transmission is made by comparing the ratio R of the received signal power from the serving cell to the sum of the received interference powers of all of the other cells in the said set of N cells with a second decision threshold parameter α, and deciding to use only the serving cell for transmission if R>α and multiple cells for transmission if R≤α.

4. A method as claimed in claim 2, which is carried out, at least in part, at user equipment located in the serving cell.

5. A method as claimed in claim 4, wherein the user equipment carries out selection of the group of M cells and informs the serving base station of the cells selected in descending order of received power.

6. A method as claimed in claim 4, wherein the serving base station employs only a sub-set of the group of M cells for the transmission.

7. A method as claimed in claim 1, which is carried out, at least in part, at a base station of the serving cell.

8. A method as claimed in claim 7, wherein user equipment in the serving cell feeds back to the base station received power measurements for N cells, where N is less than or equal to the number of cells of the network for which the user equipment has such measurements, and the base station carries out selection of the group of M cells using the fed back received power measurements for the N cells.

9. A communication system for a cellular wireless network, the system being operable to select a cell or cells for use in multiple-input/multiple-output (MIMO) transmission to user equipment or a relay station in a serving cell of the cellular wireless network, there being a set of N cells of the cellular network from which a selection of cells is to be made, N being an integral number greater than one and the set including the serving cell, wherein the system comprises:

sorting means configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, β being a decision threshold parameter.

10. A communication system for a cellular wireless network, the system being operable to select a cell or cells for use in multiple-input/multiple-output (MIMO) transmission to user equipment or a relay station in a serving cell of the cellular wireless network, wherein the system comprises:

deciding means configured to decide whether or not to use for transmission only the serving cell or multiple cells from a set of N cells of the cellular network, N being an integral number greater than one and the set including the serving cell;

sorting means operable, if the decision is to use multiple cells, and configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, β being a first decision threshold parameter.

11. A system as claimed in claim 10, wherein the deciding means are operable to compare the ratio R of the received signal power from the serving cell to the sum of the received interference powers of all of the other cells in the said set of N cells with a second decision threshold parameter α, and decide to use only the serving cell for transmission if R>α and multiple cells for transmission if R≤α.

12. Apparatus for use in a communication system for a cellular wireless network, the apparatus being operable to select a cell or cells for use in multiple-input/multiple-output (MIMO) transmission to user equipment or a relay station in a serving cell of the cellular wireless network, there being a set of N cells of the cellular network from which a selection of cells is to be made, N being an integral number greater than one and the set including the serving cell, wherein the apparatus comprises:

sorting means configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, β being a decision threshold parameter.

13. Apparatus for use in a communication system for a cellular wireless network, the apparatus being operable to select a cell or cells for use in multiple-input/multiple-output (MIMO) transmission to user equipment or a relay station in a serving cell of the cellular wireless network, wherein the apparatus comprises:

deciding means configured to decide whether or not to use for transmission only the serving cell or multiple cells from a set of N cells of the cellular network, N being an integral number greater than one and the set including the serving cell;

sorting means operable, if the decision is to use multiple cells, and configured to sort a value of a received signal power of the serving cell and respective values of received interference powers of the other cells in the set relative to the serving cell in descending order of power P, such that $P_0 \geq P_1 \geq \ldots \geq P_{N-1}$; and selection means configured to select, using the sorted powers, a group of M cells from the said set of N cells, where the cells selected are those giving the smallest value of M for which the inequality $$\sum_{k=0}^{M-1} P_k \geq \beta \sum_{i=0}^{N-1} P_i$$

is satisfied, β being a first decision threshold parameter.

14. Apparatus as claimed in claim 13, wherein the deciding means are operable to compare the ratio R of the received signal power from the serving cell to the sum of the received interference powers of all of the other cells in the said set of N cells with a second decision threshold parameter α, and decide to use only the serving cell for transmission if R>α and multiple cells for transmission if R≤α.

15. A system as claimed in claim 10, wherein at least one of the sorting means and the selection means are located in user equipment located in the said serving cell.

16. A system as claimed in claim 15, wherein the selection means are located in the user equipment and the user equipment is configured to inform a base station of the serving cell of the cells selected in descending order of received power.

17. A system as claimed in claim 16, wherein the base station employs only a sub-set of the group of M cells for the transmission.

18. A system as claimed in claim 10, wherein at least one of the sorting means and the selection means are located in the base station of the serving cell.

19. A system as claimed in claim 18, wherein the selection means are located in the base station and user equipment in the serving cell is operable to feed back to the base station received power measurements for N cells, where N is less than or equal to the number of cells for which the user equipment has such measurements, the selection means being operable to carry out selection of the group of M cells using the fed back received power measurements for the N cells.

20. A system as claimed in claim 10, wherein the said deciding means are located in user equipment located in the said serving cell or in the base station of the serving cell.

21. A system as claimed in claim 11, wherein the value of the second decision threshold parameter α is such that the signal-to-interference ratio (SIR) for a receiver in the serving cell is equal to or above a desired target value.

22. A system as claimed in claim 10, wherein the decision threshold parameter β has a value allowing multi-cell MIMO transmission using the selected M cells to achieve a desired signal-to-interference ratio (SIR).

23. A system as claimed in claim 10, wherein the decision threshold parameter β is determined locally at the serving cell.

24. A system as claimed in claim 10, wherein the decision threshold parameter β is determined centrally by a central network element.

25. A system as claimed in claim 10, wherein the decision threshold parameter β is determined by negotiation amongst the base stations of multiple cells.

26. A system as claimed in claim 10, wherein the received powers are Reference Signal Received Powers (RSRPs).

27. A system as claimed in claim 10, wherein the cellular wireless network is a 3GPP network.

28. A system as claimed in claim 10, wherein the set of N cells is the Coordinated Multi-Point Transmission (CoMP) measurement set for the serving cell.

\* \* \* \* \*